United States Patent [19]

Mueller

[11] Patent Number: 5,415,312
[45] Date of Patent: May 16, 1995

[54] CLOSURE FOR A LIQUID CONTAINER

[75] Inventor: Jonathan H. Mueller, Hermitage, Tenn.

[73] Assignee: Aladdin Synergetics, Inc., Nashville, Tenn.

[21] Appl. No.: 48,729

[22] Filed: Apr. 21, 1993

[51] Int. Cl.⁶ .............................. B65D 51/18
[52] U.S. Cl. .................... 220/254; 220/709; 220/711; 222/482; 222/545
[58] Field of Search .............. 220/254, 339, 703, 705, 220/709, 711, 717; 222/482, 498, 545

[56] References Cited

U.S. PATENT DOCUMENTS

| | | |
|---|---|---|
| D. 159,599 | 8/1950 | Chaplin . |
| D. 198,139 | 5/1964 | Edwards . |
| D. 208,935 | 10/1967 | Marien et al. . |
| D. 253,338 | 11/1979 | Hasegawa . |
| D. 263,933 | 4/1982 | Jones et al. . |
| D. 272,323 | 1/1984 | Bainton . |
| D. 278,312 | 4/1985 | Cleevely et al. . |
| D. 285,661 | 9/1986 | Brownbill . |
| D. 312,552 | 12/1990 | Carlson . |
| D. 315,872 | 4/1991 | Bixler . |
| D. 320,942 | 10/1991 | Lillelund et al. . |
| D. 321,624 | 11/1991 | Fiore et al. . |
| 2,859,557 | 11/1958 | Lattuca . |
| 2,905,350 | 9/1959 | Edwards . |
| 3,009,603 | 11/1961 | Stockdale . |
| 3,035,623 | 5/1962 | Goetz . |
| 3,372,830 | 3/1968 | Edwards . |
| 3,836,063 | 9/1974 | Sutch . |
| 3,994,411 | 11/1976 | Elfelt et al. . |
| 4,202,459 | 5/1980 | DeParales et al. . |
| 4,232,797 | 11/1980 | Waterbury . |
| 4,420,081 | 12/1983 | Dart . |
| 4,629,088 | 12/1986 | Durgin . |
| 4,723,693 | 2/1988 | DeCoster ............... 222/545 X |
| 4,738,373 | 4/1988 | DeParales . |
| 4,877,141 | 10/1989 | Hayashi et al. . |
| 4,881,668 | 11/1989 | Kitterman et al. ............ 222/482 |
| 4,949,865 | 8/1990 | Turner . |
| 4,989,746 | 2/1991 | Pierce . |
| 5,111,961 | 5/1992 | Van Melle . |
| 5,148,936 | 9/1992 | DeGrow . |
| 5,219,100 | 6/1993 | Beck et al. ............... 215/235 X |
| 5,244,113 | 9/1993 | Stymiest .................. 220/709 X |

Primary Examiner—Allan N. Shoap
Assistant Examiner—Jes F. Pascua
Attorney, Agent, or Firm—Sandler, Greenblum & Bernstein

[57] ABSTRACT

For a sturdy, reusable insulated cold beverage container, a closure including a lid and a stopper. The lid has two holes through it—a large drinking hole preferably with an ice guard secured in it and a smaller straw hole for receiving a drinking straw therein. The stopper has first and second end portions and a hinge formed between them and is formed as a separate piece from the lid. The first and second portions can be snap secured to the lid and over the drinking and straw holes, respectively, to individually seal the holes and thereby prevent the liquid contents of the container from spilling out the holes. The snap securing structures advantageously provide the only attachments of the stopper to the lid. With one end portion secured to and over its respective hole, the other end portion can be unsecured from its hole pivoted about the hinge and removably snap-fit secured to the top of the one end portion, out of the way of the open hole, and subsequently unsnapped, pivoted back to its hole and secured over it. A ledge structure of the lid supports the hinge during this pivoting step.

37 Claims, 9 Drawing Sheets

CLOSURE FOR A LIQUID CONTAINER

BACKGROUND OF THE INVENTION

The present invention relates to closures, covers or lids for beverage or other liquid containers. It more particularly relates to closures having both a drinking or pouring opening and a smaller straw opening and wherein the closures are removably positionable on the mouths of cold beverage containers.

Liquid containers, cups or bottles which allow for both transportation and consumption of liquids may be used in athletic events, such as by participants in playground basketball games. The containers may comprise a bottle or cup which generally is made of a light weight material such as plastic, and a removable cover or closure can be disposed on the container for sealing the container against leaks and spills. The containers are often thermally insulated; for example, the container may have a double shell construction with the space between the shells containing a heat insulation medium such as polyurethane foam.

An example of a liquid container having a closure cover is shown in U.S. Pat. No. 5,148,936 to DeGrow. (This patent and all of the other patents mentioned anywhere in this disclosure are hereby incorporated by reference in their entireties.) The DeGrow closure cover or lid includes three radially aligned throughopenings, namely, a dispensing opening from which liquid may be poured which is disposed near the periphery of the lid, an axle opening disposed generally concentrically about the center point of the lid, and a vent opening disposed adjacent the axle opening which may be used for receiving a drinking straw therein. A stopper member disposed on the top surface of the lid includes a downwardly extending axle lug which is fitted into the axle opening. The lug allows the stopper member to be rotated parallel to the plane of the lid. The stopper member further includes a downwardly extending sealing flange which may be fitted into the dispensing opening to seal it and a centering boss which fits within a rib projecting upwardly from the vent opening. The stopper member includes a handle adjacent the extending flange.

In use, the sealing flange and centering boss of the stopper member of DeGrow are fitted into and seal the dispensing opening and vent opening, respectively, thereby allowing the fluid to be transported without spilling or leaking out of the container. The closure cover may be opened by lifting the handle and rotating the stopper member to unseal simultaneously the dispensing and vent openings, allowing liquid to be poured from the dispensing opening or a straw to be inserted into the vent opening. When it is desired to reseal the closure member, the stopper is simply rotated in the opposite direction, and the flange and centering boss are reseated in the appropriate openings.

Although DeGrow provides for a cover which includes both a pouring opening and a vent opening for receiving a straw, both openings must be opened simultaneously. Thus, for example, if it is desired to use a straw, the pouring opening must remain open. Further, the stopper has three downwardly extending flange members and the cover has three corresponding holes to be formed therethrough. DeGrow further requires a closure cover having an axle opening and a stopper member with an axle lug, both of which only serve to secure the stopper to the cover. Even further, the axle lug must be radially compressed and snap fitted into the axle opening, should it be desired to remove the stopper for thorough cleaning thereof.

U.S. Pat. No. 5,111,961 to Van Melle discloses a thin disposable cover for use with a disposable plastic styrofoam or paper cup. The cover includes a foldback portion which may be torn inwardly from the periphery of the cover to create a drinking opening. The cover also includes a central protrusion which may be used to accommodate a straw. The upper surface of the cover has a pair of protruding tabs formed at the location of the foldback portion and a corresponding protrusion located inwardly from the foldback portion. When the foldback portion is torn and folded over, it is retained in a position away from the drinking opening thereby created due to a cooperation of the tabs and the protrusion. The Van Melle cover does not allow for selective alternate opening of both a drinking opening or a straw hole. In fact, the straw hole always remains open, and only the drinking opening would appear to be openable and closable. Further, as evidenced by the facts that the drinking opening is created by tearing and that the cover is designed for use with disposable containers, the cover would not appear to be designed for long term re-use. Rather, the cover would appear to permit the drinking opening to be opened or closed only a few times, most likely, for the consumption of only a single drink.

U.S. Pat. No. 4,949,865 to Turner shows a container lid with an integral stopper. The lid includes a rim portion and an integral closure portion which is sized and configured to be received in the single cover opening disposed in the lid. The lid also includes a pair of protrusions disposed upwardly from the rim portion on the side of the lid opposite the cover opening. The closure portion includes a lift tab and is pivotable from a position in which the closure portion is engaged within the cover opening, to a fully open position in which the lift tab is engaged and retained by the protrusions. Although Turner discloses a closure element which may be held open by engagement with an element protruding from the lid or cover, as in Van Melle, the closure element is designed to open or close for only a single pouring. Further, Turner requires a hinge element for securing the closure element to the remainder of the lid, thus complicating manufacture of the lid. In addition, the closure element may not be removed to facilitate cleaning.

Examples of other container closure or lid constructions are shown in U.S. Pat. Nos. 3,994,411 to Elfelt et al., 4,202,459 to DeParales et al., 4,232,797 to Waterbury, 4,629,088 to Durgin, 4,738,373 to DeParales and 4,629,088 to Durgin. Many of these patents are concerned with disposable drinking cup lids with integral drink flaps which can be secured in open positions to the lid.

Accordingly, there is a need for a reusable beverage container including a reusable closure having a lid and stopper therefor which allows for both the selective and alternative opening and closing of both a pouring (or drinking) hole and a smaller straw hole, and also for such a closure which can be manufactured easily and inexpensively and in which the stopper can be removed repeatedly and easily to facilitate cleaning thereof.

SUMMARY OF THE INVENTION

Directed to fulfilling these needs, the present invention includes a closure for a container including a lid removably disposable on the container, wherein the lid includes a first hole and a second hole formed therethrough. The closure further includes a stopper removably disposable on the lid and having a hinge defining first and second stopper portions on opposite sides thereof. The first and second stopper portions are rotatable about the hinge so as to be able to contact against each other. A mechanism holds the first stopper portion to the second stopper portion when the first and second stopper portions are in contact. The stopper portions can also be removably secured to the respective holes for allowing selective sealing of the holes.

In another embodiment, the lid includes a perimeter wall extending about each hole and the stopper includes a corresponding circular wall projecting downwardly from both stopper portions. The circular walls are removably disposable about the corresponding perimeter wall to simultaneously secure the corresponding stopper portion to the lid and seal the hole. The stopper can be made of a flexible plastic material and the hinge defined by a portion of the stopper which is thinner than the remainder of the stopper.

In a further embodiment, the invention is directed to the combination of a container and closure. The container can be an insulated plastic cup for beverages. In particular, it can be a sturdy, reusable double shell, foam insulated, thirty-two ounce bottle. The closure includes a lid, a first stopper and a second stopper, the lid being securable to the mouth of the container. The lid and each of the stoppers are made of a flexible plastic material. The lid has two holes formed therethrough—a large drinking or pouring hole and a smaller straw hole. Each stopper is removably securable to a different said hole to seal the holes. The closure further includes a mechanism which holds one stopper to the other stopper when one stopper is released from one of the holes. The mechanism can be a pin formed on top of one stopper and a pin hole formed on top of the other into which the pin fits.

In other words, disclosed herein is a lid having two openings and a single closure tab which can selectively seal only one or simultaneously both of the openings closed. When one is open, the closure tab can be held in place away from the open hole. The closure tab remains attached to the lid (and thus bottle) during use by remaining on the unused hole. Thus, the sealing function of the closure tab also attaches the closure tab to the lid such that no separate attachment device is needed. Also the closure tab and the lid can be completely separated from one another for thorough cleaning thereof.

DETAILED DISCUSSION OF THE PREFERRED EMBODIMENTS

Figure 1:
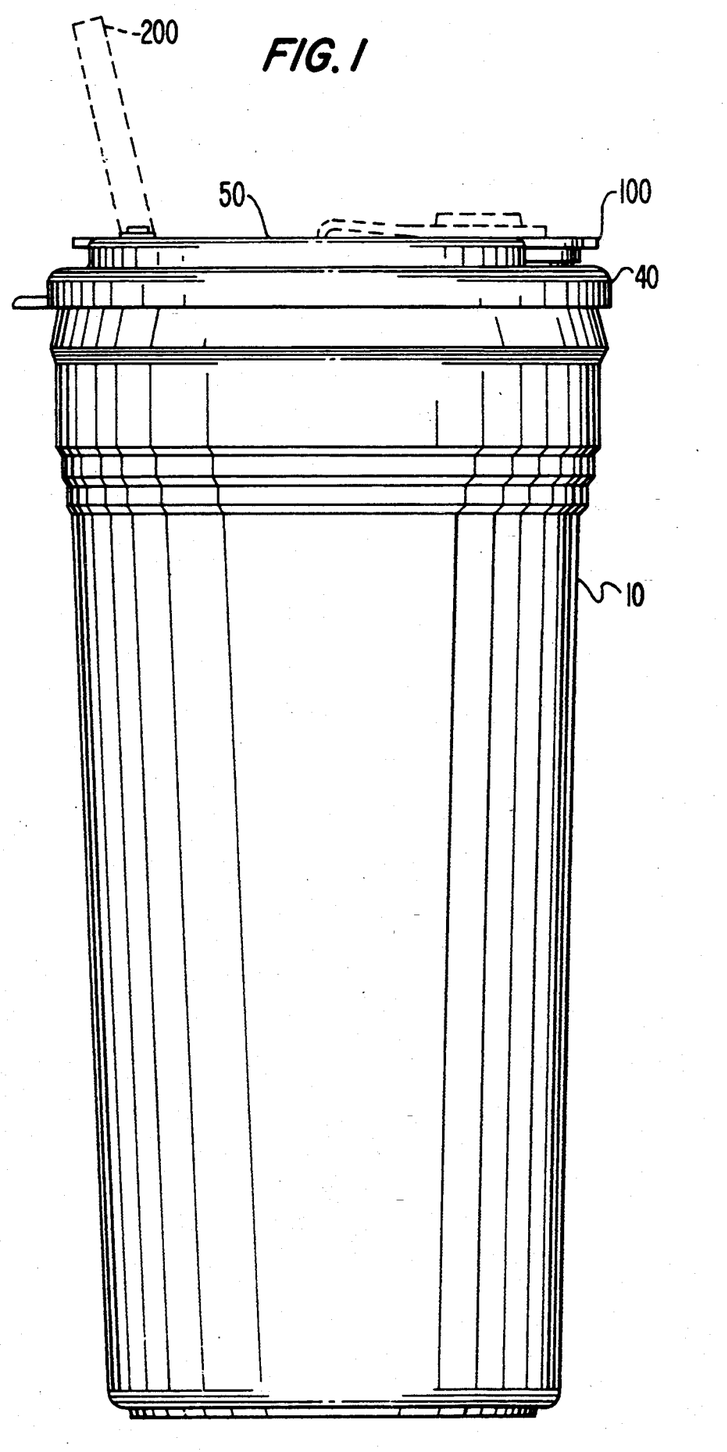
FIG. 1 is a side view of a container and a closure having a lid and stopper according to the present invention.

With reference to FIG. 1, a container and closure therefor according to the present invention are shown. Closure 40 includes lid 50 removably disposable on container or bottle 10, and stopper 100 removably disposable on lid 50. As illustrated in FIGS. 20-24, container 10 includes a generally cylindrical and slightly tapered outer shell 12 concentrically spaced from a generally cylindrical inner shell 14 to define a container having a closed bottom end 16 and an open upper end 18. Shells 12 and 14 may be molded from a plastic material such as polypropylene, and have increasing diameter in the upward direction. Inner shell 14 is disposed within outer shell 12 to define a space therebetween which is filled with a suitable thermal insulating medium such as polystyrene foam or urethane foam 13. Foam insulated double shell containers or bottles typically keep drinks colder than and do not "sweat" as much as single shell bottles. As an example, the outer diameter of outer shell 12 and thus the overall diameter of container 10 may be 3.392" at the bottom thereof and 4.178" at the top thereof, the height of outer shell 12 may be 8.023", the height of inner shell 14 may be 8.108", and the overall height of container 10 with closure 40 disposed thereon may be 8.923".

Figures 22, 24:
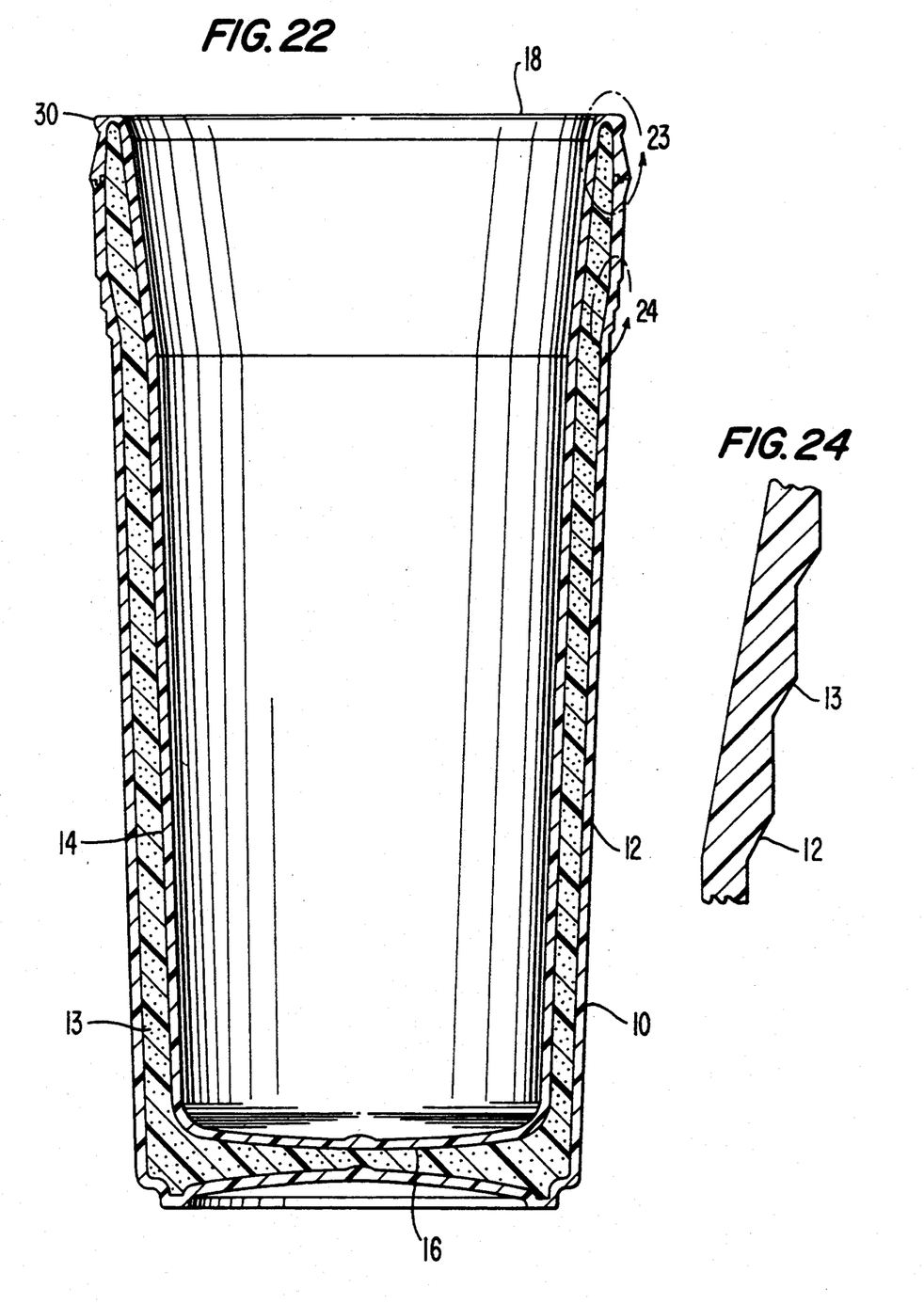
FIG. 22 is a vertical cross-sectional view of the container.
FIG. 24 is an enlarged view taken on circle 24 in FIG. 22.
Figure 23:
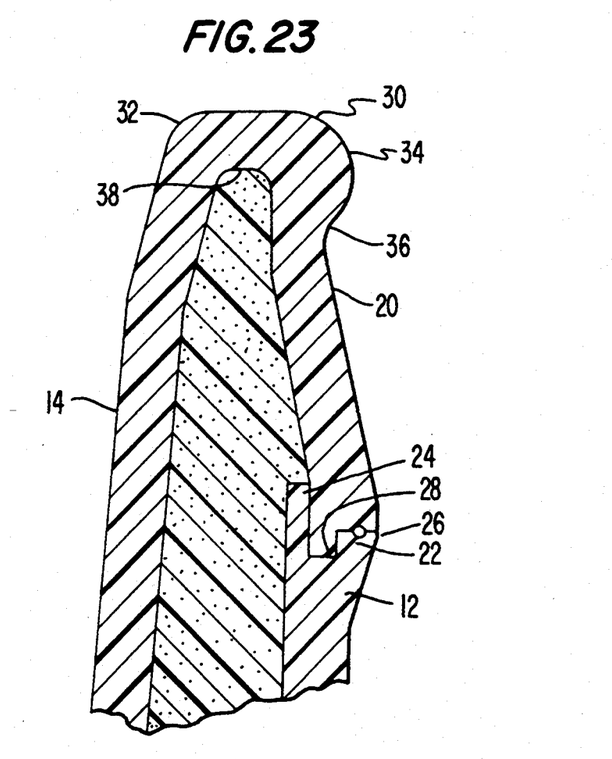
FIG. 23 is an enlarged view taken on circle 23 in FIG. 22.

Inner shell 14 includes overhanging member 20 formed along the upper periphery thereof and including downwardly projecting portion 22 at the lowest extremity. Outer shell 12 includes upper inner peripheral projection 24 and upper outer peripheral projection 26 radially spaced from the inner peripheral projection 24 disposed at the top of outer shell 12 and creating peripheral indented portion 28 therebetween. Overhanging member 20 is disposed about upper peripheral projection 24 with projecting portion 22 fitting within indented portion 28. Inner shell 14 and outer shell 12 are bonded together along some or all of the locations at which they are in contact in the region of overhanging member 20, projecting portion 22, inner projection 24, outer projection 26 and indented portion 28.

Figure 21:
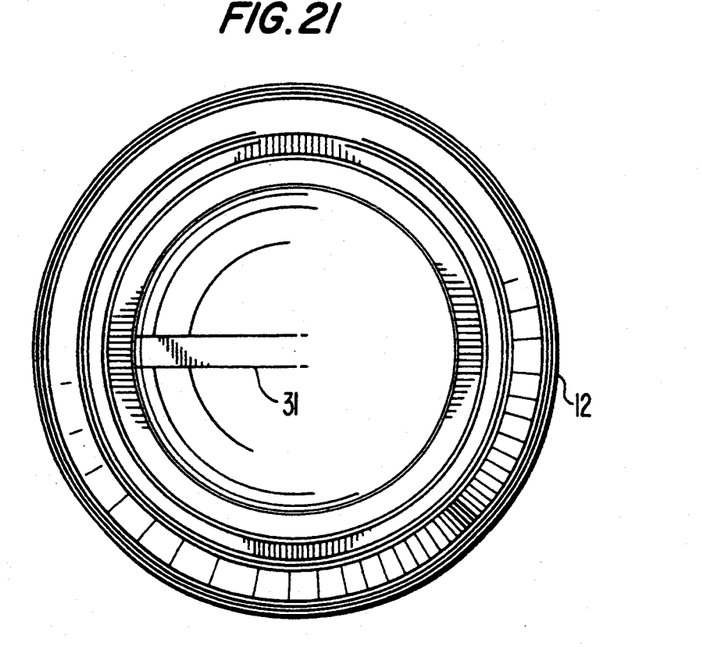
FIG. 21 is a bottom view of the container.

Upper portion 30 of overhanging member 20 is rounded and serves as the overall rim of container 10. It includes inner curved surface 32, outer curved lip 34 which curves inwardly to form recess 36, and interior curved surface 38. As an example, inner curved surface 32 may have a radius of curvature of 0.062", outer curved lip 34 may have a radius of curvature of 0.078", recess 36 may have a radius of curvature of 0.062" and interior curved surface 38 may have a radius of curvature of 0.031". With reference to FIGS. 21 and 24, the bottom of outer shell 12 and thus of container 10 includes indexing slot 31 which is used to align the bottle during printing and decorating, and transition portion 13 which is inwardly stepped, such that container 10 has a smaller outer diameter below the transition portion than above it. Thus, container 10 includes on the outside surface of outer shell 12 about four fifths of the way up from the bottom end 16, as shown in FIG. 22, a novel decorative configuration between the narrower diameter container base and the wider container top portion. This "stepped" transition configuration is best shown in FIG. 24.

Referring to FIGS. 2-13, closure 40 includes lid 50 made of a flexible plastic material such as a polypropylene copolymer and is generally circular in overall shape, with an overall diameter slightly greater than the overall upper diameter of container 10. Peripheral rim 52 of the lid 50 extends entirely about the circumference thereof, and is formed by substantially horizontal portion 54, outer curved portion 56 and substantially vertical portion 58. The interior surface of vertical portion 58 includes inner curved lip 60. Curved recess 62 is formed between curved lip 60 and the lower surface of horizontal portion 54. Tab 64 extends from rim 52 at one location. As an example, the overall diameter of lid 50 may be 4.233" measured at the bottom of vertical portion 58, outer curved portion 56 may have a radius of curvature of 0.090", recess 62 may have a radius of curvature varying between 0.015" where it meets horizontal portion 54 and 0.062" where it meets curved lip 60, and the curved lip may have a radius of curvature of 0.093".

Lid 50 is secured on container 10 by flexing rim 52 outwardly about upper portion or rim 30 of the container. Rim 52 securely fits on rim 30 of container 10, with the lower surface of horizontal portion 54 resting on the top surface of the rim, the outer curved lip 34 securely fitting within curved recess 62, and the inner curved lip 60 fitting in recess 36, thereby sealing the container against leakage and spillage along the rim. Lid 50 may be removed from container 10 by simply lifting tab 64 and outwardly flexing rim 52 so that curved lip 60 passes over curved lip 34.

Lid 50 further includes vertically extending, inner peripheral wall 66 extending upwardly from the inner edge of horizontal portion 54. While wall 66 defines the outer wall of upper lid portions 68 having upper surfaces 68c, the inner walls of upper lid portions 68 are defined by arc walls 68a and linear walls 68b. Upper lid portions 68 are generally semi-circular with a cut-off portion defined by arc walls 68a. Linear walls 68b and arc walls 68a define lower lid surface 70 between upper lid portions 68. As an example, the upper surfaces 68c may be approximately 0.255" above lower lid surface 70, and the lower lid surface may have a width between linear walls 68b of 0.837" and a maximum width between arc walls 68a of 1.760".

Walls 66, 68a and 68b are curved where they meet upper surfaces 68c of upper lid portions 68 and also where they meet lower lid surface 70. Lower lid surface 70 defines the upper surface of lid 50 between upper lid portions 68 and extends across the lid from the location of lifting tab 64, defining a first lid diameter. Lower lid surface 70 extends on both sides of the line of the first lid diameter, and being essentially collinear with lifting tab 64 provides increased flexibility for lifting lid 50 off of container 10.

Linear walls 68b each include stepped portion 72 which extends from approximately the location where linear walls 68b meet arc walls 68a, to a location on the opposite side of a second lid diameter line which is generally perpendicular to the first lid diameter line defined above. Horizontal surface 72a of stepped portion 72 is disposed at a level which is between the level of lower lid surface 70 and upper surfaces 68c of upper lid portions 68. As explained further below, stepped portion 72 acts as a ledge to support stopper 100. As an example, horizontal surface 72a may be 0.165" above lower lid surface 70. The width of lower lid surface 70 between ledges 72 is less than the width of lower lid surface between linear walls 68b, and for example, may be 0.550".

Drinking or pouring hole 80 and straw hole 90 are formed through lower lid surface 70 of lid 50. Drinking hole 80 is disposed substantially symmetrically about the first lid diameter line on one side of the second diameter line as defined above, and extends into the region defined between arc walls 68a of upper lid portions 68, such that the arc walls are approximately concentric about the drinking hole. Perimeter wall 82 extends above lower lid surface 70 and about drinking hole 80 and has rounded upper rim 82a. Perimeter wall 82 is curved where it extends from lower lid surface 70, and extends above surface 70 to approximately the same level as horizontal surface 72a of ledge 72. For example, perimeter wall 82 at rim 82a and ledge 72 may have a height of approximately 0.165" above the top side of lower lid surface 70, and drinking hole 80 may have an inner diameter of approximately 1.353" at perimeter wall 82 below rim 82a, and an outer diameter of 1.500" at the location of rim 82a.

Figures 10, 11, 12, 13:
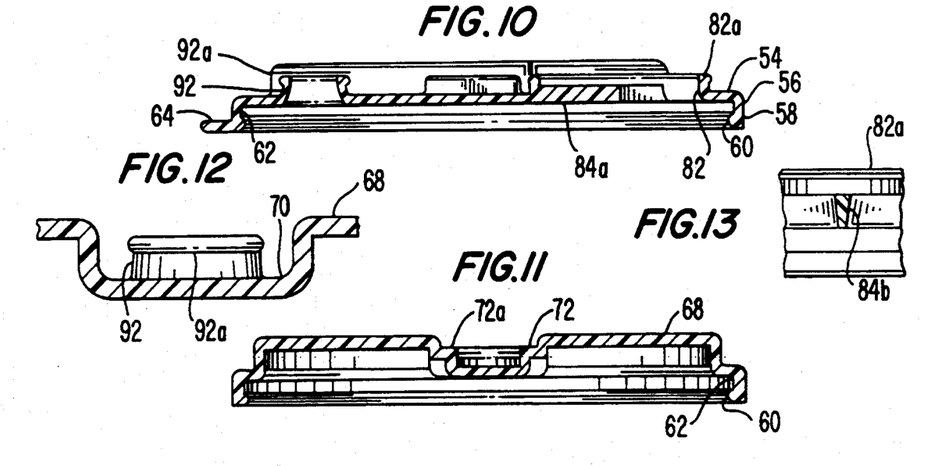
FIG. 10 is a cross-sectional view taken along line 10—10 in FIG. 5.
FIG. 11 is a cross-sectional view taken along line 11—11 in FIG. 5.
FIG. 12 is a cross-sectional view taken along line 12—12 in FIG. 5.
FIG. 13 is a cross-sectional view taken along line 13—13 in FIG. 5.
Figure 14:
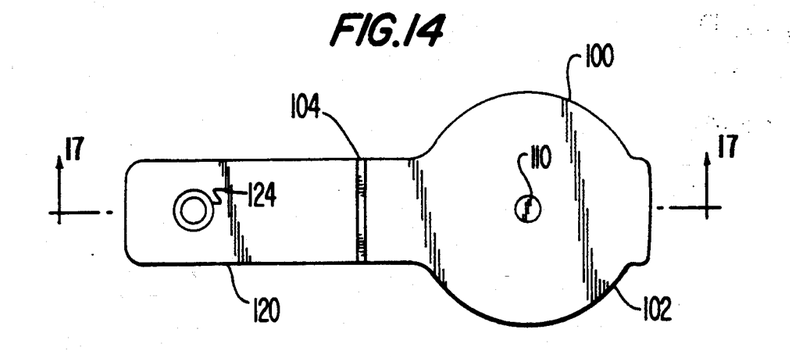
FIG. 14 is a top view of the stopper of FIG. 1.
Figure 15:
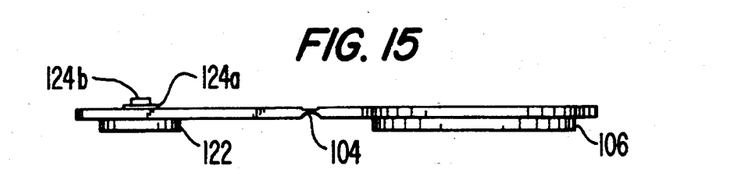
FIG. 15 is a longitudinal side view of the stopper.
Figure 16:
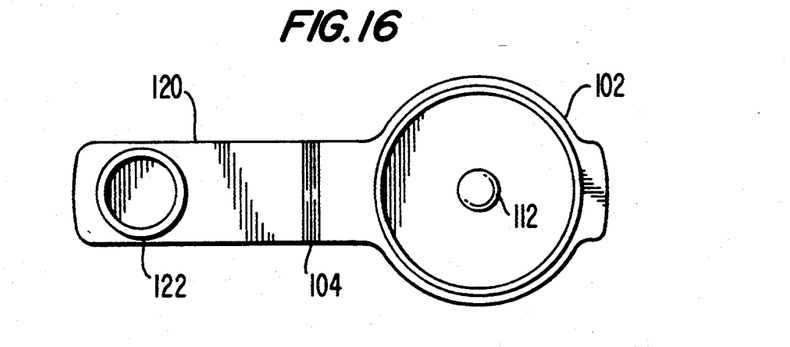
FIG. 16 is a bottom view of the stopper.
Figure 17:
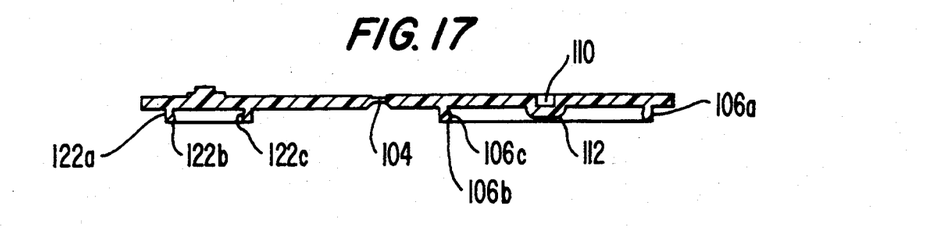
FIG. 17 is cross-sectional view taken along line 17-17 in FIG. 14.
Figure 18:
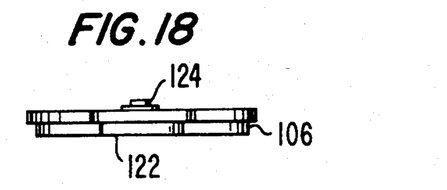
FIG. 18 is an end view of the stopper.
Figure 19:
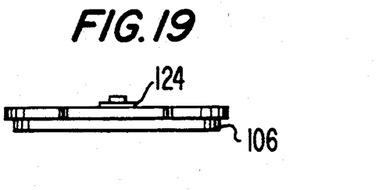
FIG. 19 is an end view of the stopper from the opposite direction of the view in FIG. 18.
Figure 20:
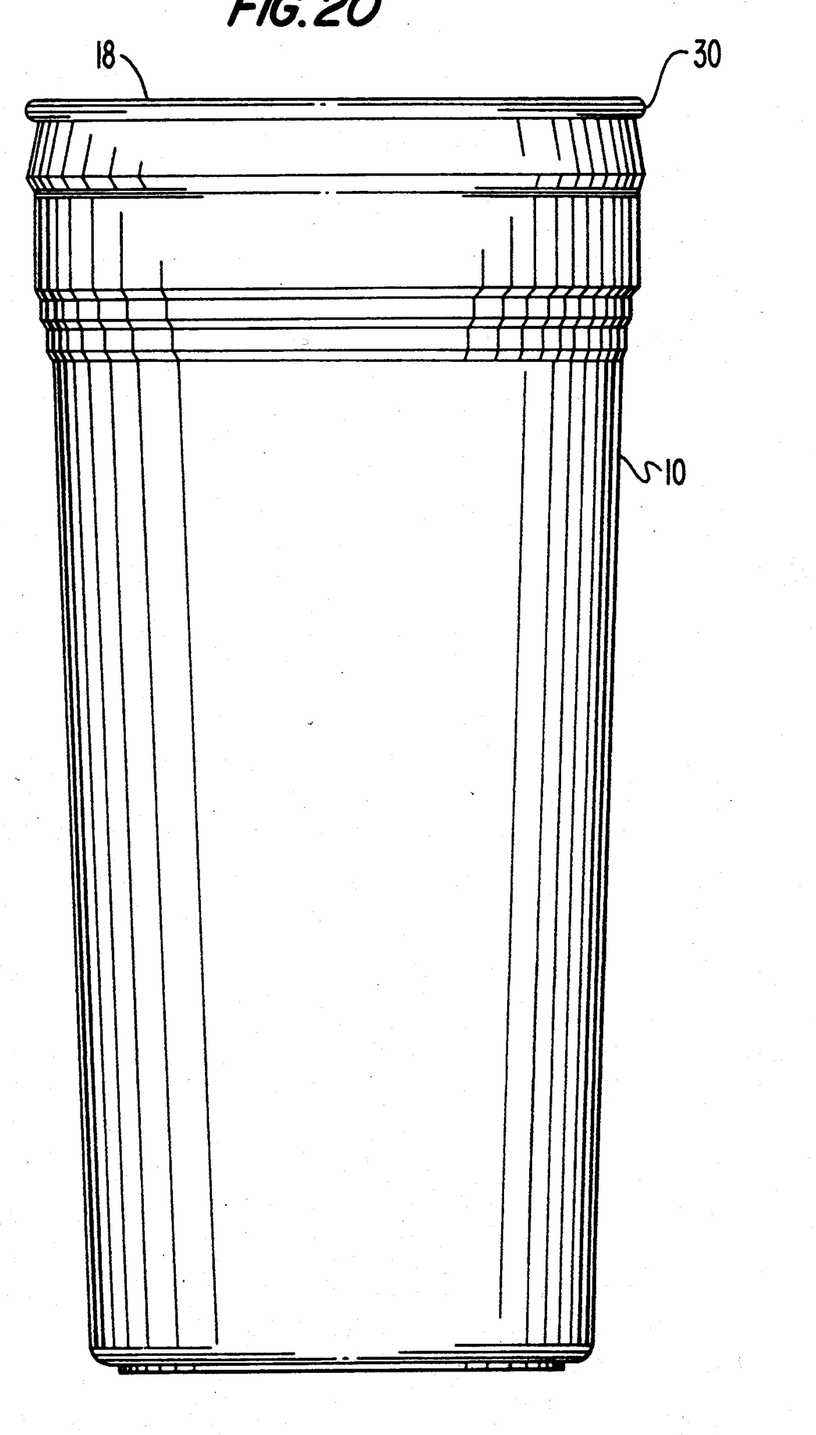
FIG. 20 is a side view of the container of FIG. 1 with the closure removed therefrom.

Y-shaped ice guard 84 having walls 84a, 84b and 84c is disposed within drinking hole 80. Although the lower surface of each wall 84a–84c of ice guard 84 is approximately even with the undersurface of lower lid surface 70, however, the thicknesses of each wall 84a–c are greater than the thickness of lower lid portion 70. Accordingly, the upper surface of ice guard 84 extends to a level above lower lid surface 70. The upper surfaces of ice guard 84 are below the level of rim 82a of perimeter wall 82 such that the ice guard can be considered as disposed within drinking hole 80. As an example, walls 84a–c may have a height of 0.14". As shown in FIG. 13, walls 84a–c may be tapered. For example, the thickness of walls 84a–c may decrease from 0.065" at the top such that the side surfaces of walls 84a–c are tapered inwardly at an angle of 5°. The lower surface of walls 84a–c may be rounded, for example, with a radius of curvature of 0.020".

Straw hole 90 has a smaller diameter than drinking hole 80 and is disposed through lower lid surface 70 on the opposite side of the second lid diameter line from the drinking hole. Straw hole 90 also is disposed substantially symmetrically about the first lid diameter line, between linear walls 68b of upper lid portions 68. The centers of straw hole 90 and drinking hole 80 are disposed substantially collinear with respect to the center of lid 50, with straw hole 90 and drinking hole 80 disposed at substantially opposite sides of lower lid surface 70.

Perimeter wall 92 extends above lower lid surface 70 about straw hole 90 and has rounded upper rim 92a. It is curved at the location where it extends from lower lid surface 70, and extends above that surface to a level slightly above the level of horizontal surface 72a of ledge 72. As an example, drinking hole 80 may have an inner diameter of approximately 0.400" at perimeter wall 92 below rim 92a, and an outer diameter of 0.541" at the location of rim 92a. Thus, straw hole 90 has a smaller diameter than drinking hole 80, approximately slightly less than a third of the diameter thereof. Additionally, the distance between the centers of drinking hole 80 and straw hole 90 may be 2.534", as an example.

Referring to FIGS. 14–19, stopper 100, which may be made of a flexible material such as a polypropylene copolymer, is shown to be "key" shaped. Thinner region (or hinge) 104 of the stopper 100 extends the across the width of the stopper at a central location thereof and defines rounded portion 102 and linear portion 120 on opposite sides thereof. As shown, thinner region 104 may be slightly displaced from rounded portion 102 such that a relatively small linear portion is formed between rounded portion 102 and thinner region 104. When stopper 100 is disposed on lid 50, rounded portion 102 is disposed over drinking hole 80 and the end of linear portion 120 is disposed over straw hole 90. As an example, the thickness of stopper 100 other than at thinner region 104 may be 0.080", and the thickness of the thinner region may be 0.010".

Thinner region 104 acts as a hinge about which rounded portion 102 and linear portion 120 may be rotated into contact with each other. Although hinge 104 is thinner than the remainder of stopper 100, the thickness of the hinge is sufficient to allow rounded portion 102 and linear portion 120 to be freely rotated an indefinite number of times without tearing or otherwise damaging the hinge. The width of linear portion 120 is greater than the width of lower lid surface 70 between ledges 72, and less than the width of lower lid surface 70 between linear walls 68b, so that the linear portion can fit between linear walls 68b and be supported by the ledges. As an example, the width of linear portion 120 may be 0.750". The diameter of rounded portion 102 is such that the width thereof is always less than the width of lower lid surface 70 between arc walls 68a. Thus, rounded portion 102 fits between arc walls 68a. As an example, the diameter of rounded portion 102 may be 1.700".

Circular wall 106 extends downwardly from the lower surface of rounded portion 102 and is substantially concentric about the center of rounded portion 102. Wall 106 has inwardly sloping outer surface 106a and inner curved lip 106b which defines recess 106c in conjunction with the lower surface of rounded portion 102. The inner diameter of wall 106 at recess 106c is slightly greater than the outer diameter of perimeter wall 82 at rim 82a, and the inner diameter of wall 106 at curved lip 106b is slightly less than the outer diameter of perimeter wall 82 at rim 82a. Thus, rounded portion 102 may be sealingly secured on drinking hole 80 by flexing wall 106 slightly outwardly so that it passes over rim 82a, thereby allowing wall 106 to flex inwardly, such that rim 82a fits snugly within recess 106c and lip 106b is held below rim 82a. Rounded portion 102 may be removed from drinking hole 80 by again outwardly flexing wall 106. As an example, wall 106 may have an inner diameter at recess 106c of 1.507" and an inner diameter at curved lip 106c of 1.491".

Rounded portion 102 further includes circular indent (or pin hole) 110 formed in the top surface thereof, generally concentrically about the center point of rounded portion 102. Indent 110 extends substantially through the plane defined by stopper 100 and is bounded on its lower surface by protrusion 112. The inner and lower peripheral surface of indent 110 is rounded, as is the outer peripheral surface of protrusion 112. As an example, the diameter of indent 110 may be 0.156" and the depth of indent 110 may be 0.090".

Circular wall 122 extends downwardly from the lower surface of linear portion 120 of stopper 100, at a location adjacent the end of the linear portion. Wall 122 has inwardly sloping outer surface 122a and inner curved lip 122b, which defines recess 122c in conjunction with the lower surface of linear portion 102. The inner diameter of wall 122 at recess 122c is slightly greater than the outer diameter of perimeter wall 92 at rim 92a of straw hole 90, and the inner diameter of wall 122 at curved lip 122b is slightly less than the outer diameter of perimeter wall 92 at rim 92a. Thus, linear portion 120 may be secured at one end on drinking hole 80, to thereby seal the drinking hole, by flexing wall 122 slightly outwardly so that it passes over rim 92a and allowing wall 122 to flex inwardly, such that rim 92a fits snugly within recess 122c and lip 122b is held below rim 92a. The end of linear portion 120 may be removed from straw hole 80 by again outwardly flexing wall 122. As an example, wall 122 may have an inner diameter at recess 122c of 0.547" and an inner diameter at curved lip 122c of 0.530".

Linear portion 102 further includes a circular raised protrusion 124 protruding upward from the top surface thereof and located generally concentrically about the center point of wall 122. Protrusion 124 has a smaller diameter than wall 122. Protrusion 124 is stepped, and includes circular base 124a and nipple (or pin) 124b projecting from the upper surface of base 124a. Nipple 124b has a rounded upper surface, a diameter which is less than the diameter of base 124a and minutely less than the diameter of circular indent 110, and a height of which is less than the depth of indent 110. Nipple 124b may be securely but removably held within indent 110, and thus, the end of linear portion 120 may be removably secured to rounded portion 102 by rotation of either linear portion 120 or the rounded portion about hinge 104 until the portions are adjacent each other and nipple (or pin) 124b inserted into indent (or pin hole) 110. As an example, the diameter of base 124a may be 0.250", the height of base 124a may be 0.020", the diameter of nipple 124b may be 0.150", and the height of nipple 124b may be 0.060".

Figure 2:
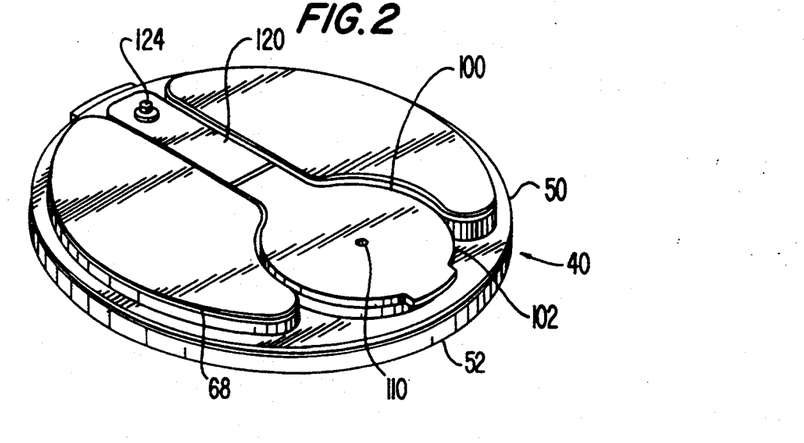
FIG. 2 is a perspective view of the closure of FIG. 1 showing the lid and the stopper disposed thereon in a first configuration.

Stopper 100 can assume four different positions relative to lid 50. As shown in FIG. 2, circular wall 122 of the stopper linear portion 120 is disposed about perimeter wall 92 of straw hole 90, and circular wall 106 of the stopper rounded portion 102 is disposed about perimeter wall 82 of drinking hole 80, thereby simultaneously sealing closed both the straw hole and the drinking hole and also securing the stopper to lid 50. In this position, container 10 is completely sealed against spillage or leakage.

Figure 3:
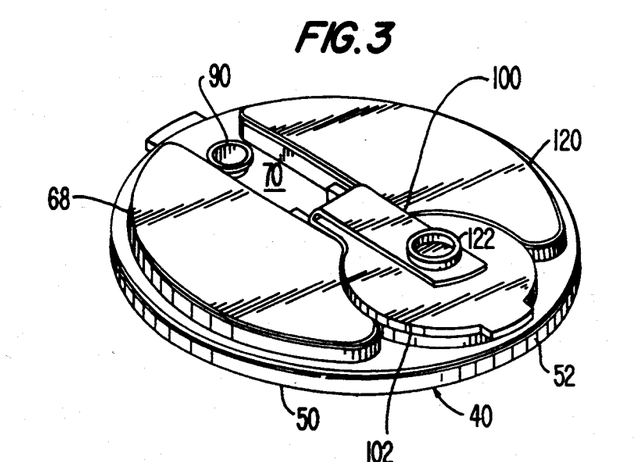
FIG. 3 is a perspective view similar to that of FIG. 2 showing the lid and the stopper disposed thereon in a second configuration.

As shown in FIG. 3, circular wall 106 of rounded portion 102 of stopper 100 is disposed about perimeter wall 82, thereby simultaneously sealing drinking hole 80 and securing stopper 100 to lid 50. Linear portion 120 is folded about hinge 104 and secured to the upper surface of rounded portion 102 by inserting or pressing nipple 124b into indent 110. In this position, drinking hole 80 is sealed against spillage, while access is provided for inserting a straw 200 into straw hole 90. Further, linear portion 120 is held well away from straw hole 90, precluding interference with the inserted straw. This configuration along with straw 200 is shown in phantom lines in FIG. 1.

Figure 4:
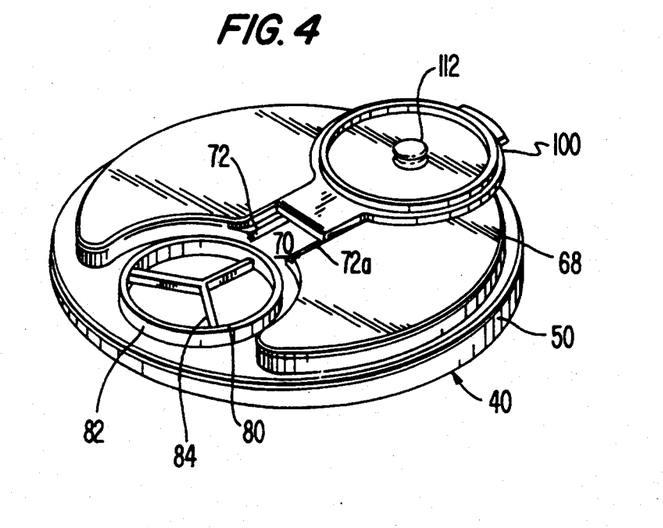
FIG. 4 is a perspective view of the closure from the opposite direction of the views in FIGS. 2 and 3 and shows the lid and the stopper disposed thereon in a third configuration.

As depicted in FIG. 4, circular wall 122 of the stopper linear portion 120 is disposed about perimeter wall 92, thereby simultaneously sealing straw hole 90 and securing stopper 100 to lid 50. Rounded portion 120 is folded about hinge 104 and secured to the upper surface of linear portion 120 by inserting nipple 124b into indent 110. Part of rounded portion 120 is disposed against surface 68c of upper lid portion 68. In this position, straw hole 80 is sealed against spillage, while access is provided for pouring of liquid through or drinking from drinking hole 80. Further, rounded portion 102 is held well away from drinking hole 80, precluding interference with drinking or pouring therefrom.

Figure 5:
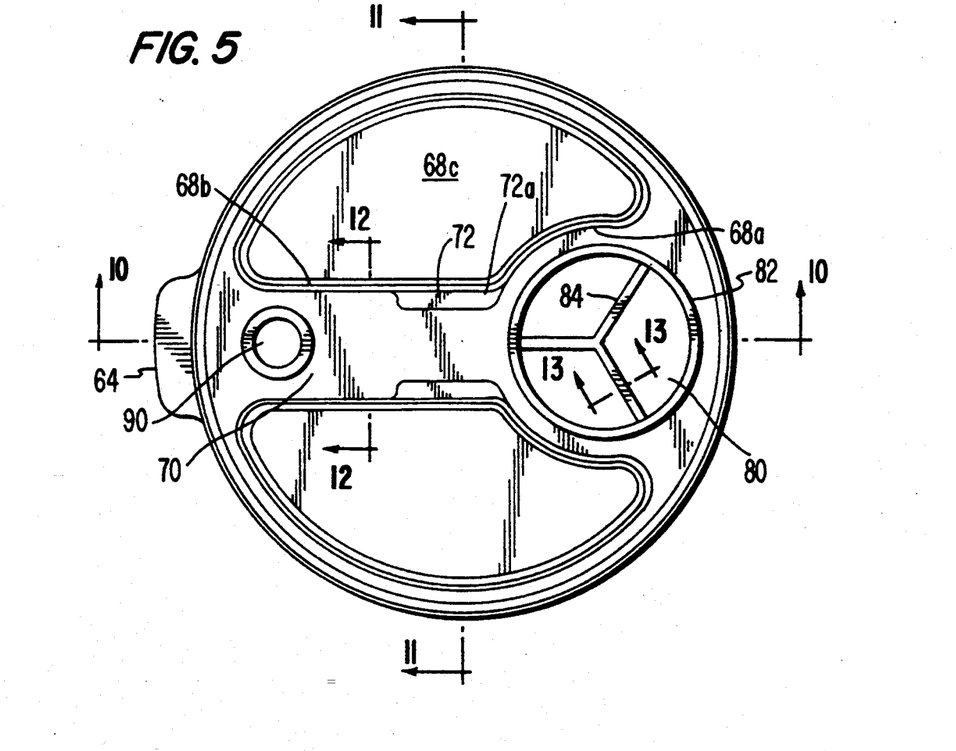
FIG. 5 is a top view of the lid of FIG. 1 with the stopper thereof removed.
Figure 6:
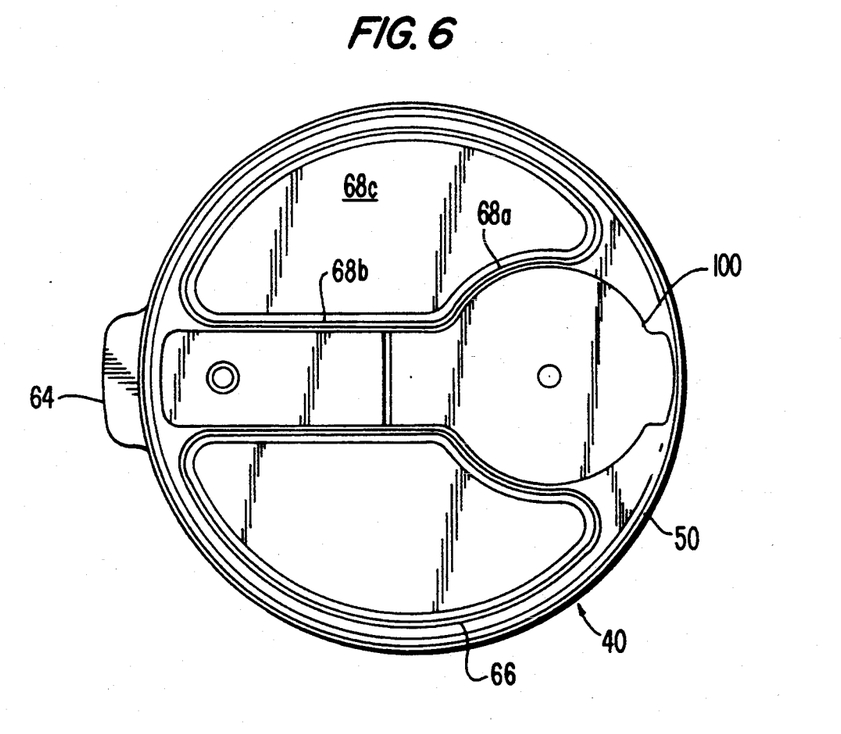
FIG. 6 is a top view of the closure of FIG. 1 showing the lid with the stopper disposed thereon.
Figure 7:
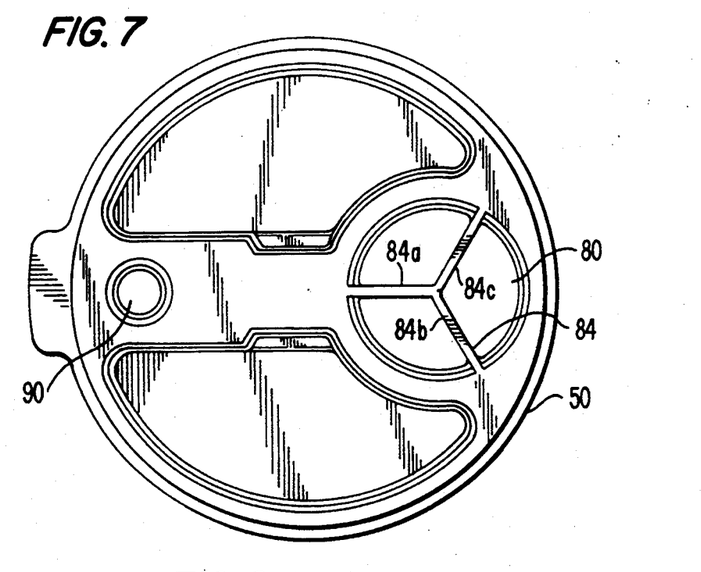
FIG. 7 is a bottom view of the lid.
Figure 8:
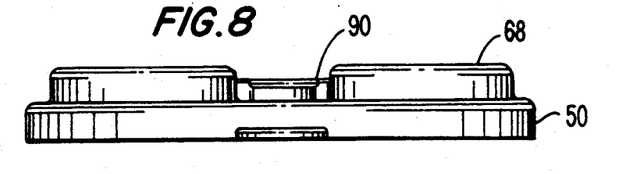
FIG. 8 is an end view of the lid without the stopper.
Figure 9:
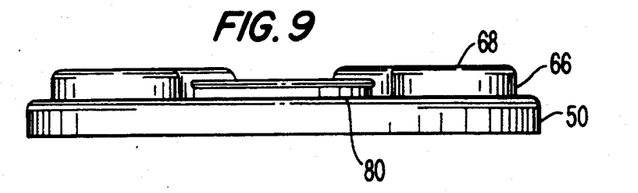
FIG. 9 is an end view of the lid without the stopper and from the opposite direction of the view shown in FIG. 8.

Finally, referring to FIG. 5, stopper 100 may be completely removed from lid 50, allowing access to container 10 through both straw hole 90 and drinking hole 80. In this situation, the straw hole 90 may serve as a vent for the drinking hole 80. Further, since stopper 100 is completely removed, both the stopper and the upper surfaces of lid 50 may be cleaned thoroughly.

With further reference to FIGS. 2-5 and as discussed above, linear portion 120 is disposed between linear walls 68b, such that hinge 104 is supported on ledges 72. Ledges 72 thereby prevent hinge 104 from being pushed or falling to the level of lower surface 70 when either rounded portion 102 or linear portion 120 is rotated about the hinge to uncover one of the drinking and straw holes. By preventing hinge 104 from being lowered below the level of ledge 72, the unintentional unsealing of the lid hole which is to remain sealed during rotation of stopper 100 about the hinge is avoided. Since during rotation about hinge 104 one end of stopper 100 has been removed from sealing engagement with one of the lid holes, the stopper is secured on lid 50 only at the other lid hole. Thus, ledge 72 prevents unintentional disengagement of stopper 100 from lid 50 when it is desired only to unseal one hole.

Figure 25:
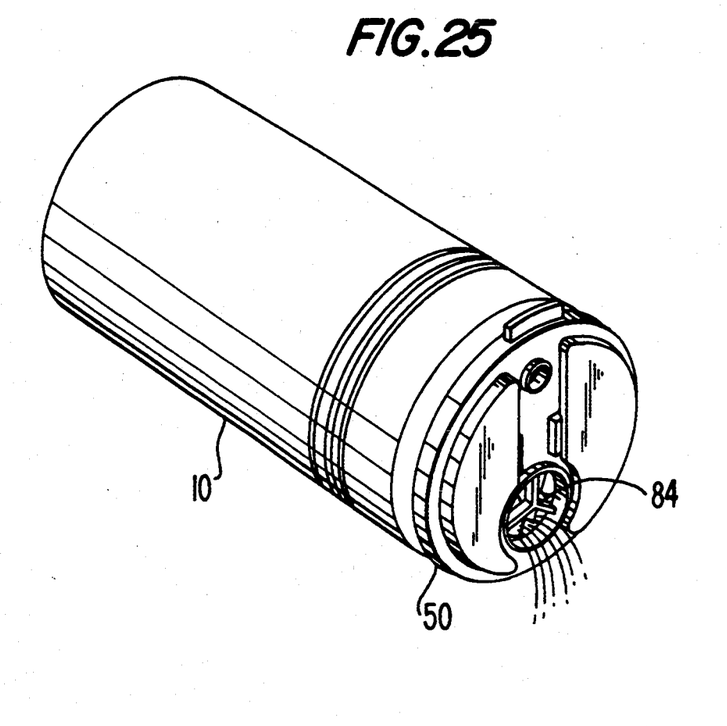
FIG. 25 is a perspective view of the container and lid of FIG. 1 illustrated in a pouring position.

With further reference to FIG. 25, the functioning of ice guard 84 to block the unintentional pouring or passage of ice out of drinking hole 80 is shown. Particularly, ice guard walls 84a-c block larger chunks of ice in the container 10 from passing out of drinking hole 80 when the container is tilted.

The present invention provides the advantage of having an insulated container with two access holes, in which each hole can be opened individually by a stopper device. Thus, although possible, it is not necessary that both holes be opened or closed simultaneously. When it is desired to have only one hole opened, the portion of the stopper which covers that hole can be secured well away from that hole so as to preclude interference of the stopper with drinking (or pouring) from the larger hole, or drinking from a straw disposed through the smaller hole. Further, the stopper is attached to the lid through the same mechanism which seals the holes. Thus, a separate mechanism for securing the stopper to the lid, which generally requires further holes disposed through the lid, snap-in hinges or studs, is avoided, simplifying and reducing the costs of production. Finally, the stopper is easily removable from the lid, allowing for thorough cleaning of both the lid and the stopper.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

I claim:

1. A closure for a container, comprising:
   a lid removably disposable on a liquid container, said lid including a first hole and a second hole formed therethrough;
   a stopper disposable on said lid, said stopper including a hinge defining first and second stopper portions on opposite sides thereof, said first and second stopper portions being rotatable about said hinge so as to be able to contact each other, said stopper further including holding means for holding said first stopper portion to said second stopper portion when said first and second stopper portions are in contact;
   first sealing means allowing said first stopper portion to be removably secured to said first hole for allowing selective sealing of said first hole relative to the liquid container; and
   second sealing means allowing said second stopper portion to be removably secured to said second hole for allowing selective sealing of said second hole relative to the liquid container.

2. The closure recited in claim 1, wherein said holding means comprises a protrusion formed on one of said first and second stopper portions and an indented region formed in the other of said first and second stopper portions, said protrusion being removably securable within said indented region to hold said first and second portions in contact.

3. The closure recited in claim 2, wherein said first hole has a larger diameter than that of said second hole.

4. The closure recited in claim 3, wherein said lid includes an ice guard disposed generally in said first hole.

5. The closure recited in claim 3, wherein said first stopper portion includes a rounded portion disposable over said first hole and said second stopper portion includes a linear portion disposable over said second hole.

6. The closure recited in claim 1, wherein said first sealing means comprises a first circular wall projecting downwardly from said first stopper portion and a first perimeter wall extending about said first hole, said circular wall being disposed about said first perimeter wall to simultaneously secure said first stopper portion to said lid and to seal said first hole.

7. The closure recited in claim 6, wherein said second sealing means comprises a second circular wall projecting downwardly from said second stopper portion and a second perimeter wall extending about said second hole, said second circular wall being disposed about said second perimeter wall to simultaneously secure said second stopper portion to said lid and to seal said second hole.

8. The closure recited in claim 1, wherein said stopper is made of a flexible plastic material, and said hinge is defined by a portion of said stopper which is thinner than the rest of said stopper.

9. The closure recited in claim 1, wherein said stopper is made of a flexible plastic material, and said hinge is thinner than the adjacent portions of said first and second stopper portions.

10. The closure recited in claim 1, wherein said lid has an upper lid portion and a lower lid surface, said first and second holes are disposed through said lower lid surface, said lid includes a ledge defined between said upper lid portion and said lower lid surface, and said stopper is disposed upon said lower lid surface with said hinge disposed upon said ledge.

11. The closure recited in claim 1, wherein said stopper is formed as a separate piece from said lid and in use is entirely separable from said lid.

12. The closure recited in claim 1, wherein the diameter of said first hole is approximately slightly less than a third of that of said second hole.

13. The closure recited in claim 1, wherein said lid includes a peripheral structure configured for removably securing said lid to a rim of a mouth of the liquid container.

14. In combination, the closure recited in claim 1 and a container.

15. The combination of claim 10, wherein said container comprises a double shell, formed insulated, cold drink bottle.

16. A closure for a container, comprising:
a lid securable to a mouth of a liquid containing container, said lid including a pair of holes, each said hole when open and with said lid secured to the container allowing the passage therethrough of the liquid from the container;
a stopper comprising first and second stopper portions connected to each other, said stopper including a hinge, and said first and second stopper portions are on opposite sides of said hinge, and said hinge being connected to each of said first and second stopper portions and not connected to said lid; and
sealing means for sealing with said stopper selectively either one or simultaneously both of said holes, said sealing means removably securing said stopper to said lid.

17. The closure recited in claim 16, wherein said first and second stopper portions are rotatable about said hinge so as to be able to contact each other.

18. In combination, the closure recited in claim 15 and a container.

19. The combination of claim 18, wherein said container comprises a double shell, foamed insulated, cold drink bottle.

20. A closure for a container, comprising:
a lid securable to a mouth of a liquid containing container, said lid including a pair of holes, each said hole when open and with said lid secured to the container allowing the passage therethrough of the liquid from the container;
a stopper comprising first and second stopper portions;
sealing means for sealing with said stopper selectively either one or simultaneously both of said holes, said sealing means removably securing said stopper to said lid; and
holding means for holding said first stopper portion to said second stopper portion when said first and second stopper portions are in contact.

21. The closure recited in claim 20, wherein said sealing means comprise a circular wall projecting downwardly from each said first and second stopper portion and a corresponding perimeter wall extending about each said hole, each said circular wall being removably disposable about the corresponding perimeter wall.

22. A closure for a container, comprising:
a lid having a first hole and a second hole, said lid being releasably securable to a mouth of a liquid container;
a first stopper member releasably securable to said lid at said first hole to thereby seal said first hole closed relative to the container;
a second stopper member releasably securable to said lid at said second hole to thereby seal said second hole closed relative to the container; and
a holding device which can hold said first stopper member on and to said second stopper member when said first stopper member is unsecured relative to said first hole and said second stopper member is secured over said second hole.

23. The closure recited in claim 22, wherein said holding device comprises a snap-fit holding device.

24. The closure recited in claim 22, wherein said holding device holds the top of said first stopper member to the top of said second stopper member.

25. In combination, the closure recited in claim 22 and a container.

26. The combination of claim 25, wherein said container comprises a double shell, foamed insulated, cold drink bottle.

27. A closure for a container, comprising:
a lid having first and second holes, said lid being releasably securable on a liquid container, and each said hole when open and with said lid secured to the container allowing the passage therethrough of liquid from the container; and
an elongate stopper member having first and second stopper ends and a hinge therebetween, said first stopper end being releasably securable to said lid and at said first hole to thereby seal said first hole closed relative to the container, said second stopper end being releasably securable to said lid and at said second hole to thereby seal said second hole closed relative to the container, and said hinge being connected to each of said first and second stopper ends and not connected to said lid so that said stopper member is releasably securable on said liquid container by cooperation of said first stopper end with said first hole and said second stopper end with said second hole;
said first end when unsecured from over said first hole and with said second end secured over said second hole is pivotal about said hinge towards said second end and out of the way of said first hole.

28. The closure recited in claim 24, wherein said lid has a support ledge which supports said hinge as said first end is pivoted.

29. In combination, the closure recited in claim 27, and a container.

30. The combination of claim 29, wherein said container comprises a double shell, foamed insulated, cold drink bottle.

31. A closure for a container, comprising:
a lid having first and second holes, said lid being releasably securable on a liquid container;
an elongate stopper member having first and second stopper ends and a hinge therebetween, said first stopper end being releasably securable to said lid and at said first hole to thereby seal said first hole closed relative to the container, said second stopper end being releasably securable to said lid and at said second hole to thereby seal said second hole closed relative to the container;
said first end when unsecured from over said first hole and with said second end secured over said second hole is pivotal about said hinge towards said second end and out of the way of said first hole; and
securing means for securing said first stopper end, when pivoted about said hinge and away from said first hole, on and to said second stopper end.

32. A stopper for a lid disposable on a container, the lid including a first hole and a second hole formed therethrough, said stopper comprising:
a first stopper portion;
a second stopper portion;
a hinge between said first and second stopper portions, each said stopper portion being removably engageable with a different one of the holes to thereby seal the hole, at least one of said first and second stopper portions being rotatable about said hinge so as to be able to come into contact with the other;
a protrusion formed on said first stopper portion; and
an indent formed in said second stopper portion;
wherein said protrusion is removably securable within said indent to hold said first and second stopper portions to each other.

33. The stopper recited in claim 32, wherein the lid includes a perimeter wall extending about each of the holes, said stopper including a circular wall corresponding to each perimeter wall and projecting downwardly from each said stopper portion, each said circular wall being removably disposable about the corresponding perimeter wall to simultaneously secure said stopper portion to the lid and seal one of the lid holes.

34. The stopper recited in claim 32, wherein said first stopper portion comprises a rounded portion disposable over the first hole and said second stopper portion comprises a linear portion disposable over the second hole.

35. The stopper recited in claim 32, wherein said first and second stopper portions and said hinge are made of a flexible plastic material, said hinge being defined by the plastic material thereof being thinner than that of both of said first and second stopper portions.

36. A method of sealing and unsealing a lid for a container, the lid including two holes disposed therethrough, said method comprising:
disposing a continuous stopper comprising first and second stopper portions on the lid so as to seal each of the holes and simultaneously secure the stopper to the lid at each hole;
selectively unsealing one of the holes by unsecuring and removing the first stopper portion from a selected hole, the second stopper portion remaining secured to the lid at the non-selected hole so that the non-selected hole remains sealed; and
flipping the first stopper portion which was removed from the selected hole over into contact with the second stopper portion, and thereafter, snap fit securing the portions to each other.

37. The method recited in claim 36, further comprising, after said unsealing step, inserting a drinking straw into the unsealed hole.

* * * * *

UNITED STATES PATENT AND TRADEMARK OFFICE
CERTIFICATE OF CORRECTION

PATENT NO. : 5,415,312
DATED : May 16, 1995
INVENTOR(S) : Jonathan H. MUELLER

It is certified that error appears in the above-indentified patent and that said Letters Patent is hereby corrected as shown below:

At column 6, line 43, change "are" (first occurrence) to ---arc---.
At column 11, line 39 (claim 15, line 1), change "10," to ---14,---.
At column 11, line 62 (claim 18, line 1), change "15" to ---16---.
At column 13, line 3 (claim 28, line 1), change "24," to ---27,---.

Signed and Sealed this

Fifth Day of November, 1996

Attest:

BRUCE LEHMAN

Attesting Officer     Commissioner of Patents and Trademarks